United States Patent [19]

Buckley et al.

[11] Patent Number: 4,770,485
[45] Date of Patent: Sep. 13, 1988

[54] APPARATUS TO LAUNCH SEPARATED MODE GROUPS INTO OPTICAL FIBERS

[75] Inventors: Robert H. Buckley, Oceanside; James L. Gundersen, Laguna Beach, both of Calif.

[73] Assignee: Hughes Aircraft Company, Los Angeles, Calif.

[21] Appl. No.: 46,805

[22] Filed: May 5, 1987

[51] Int. Cl.⁴ .................. G02B 6/32; H04B 9/00; G02F 1/00

[52] U.S. Cl. ............... 350/96.18; 350/96.15; 350/96.16; 350/96.20; 350/96.10; 370/1; 370/3; 455/600; 455/612; 455/613

[58] Field of Search ............... 350/96.10, 96.15, 96.16, 350/96.21, 96.18, 96.31, 96.19, 96.20; 370/1, 3; 455/600, 609, 610, 612, 613

[56] References Cited

U.S. PATENT DOCUMENTS

| | | |
|---|---|---|
| 3,914,880 | 10/1975 | Dakss et al. ............... 350/96.21 |
| 3,977,764 | 8/1976 | l'Auria et al. ............... 350/96.16 X |
| 4,053,764 | 10/1977 | Sierak et al. ............... 350/96.16 X |
| 4,128,302 | 12/1978 | DiVita ............... 350/96.18 |
| 4,154,529 | 5/1979 | Dyott ............... 350/96.18 X |
| 4,178,066 | 12/1979 | DiVita ............... 350/96.18 |
| 4,366,565 | 12/1982 | Herskowitz ............... 370/1 |
| 4,381,137 | 4/1983 | Berg et al. ............... 350/96.18 |
| 4,413,879 | 11/1983 | Berthold, III et al. ............... 350/96.19 |
| 4,472,797 | 9/1984 | Nicia ............... 370/1 |
| 4,516,828 | 5/1985 | Steele ............... 350/96.16 |
| 4,585,300 | 4/1986 | Landis et al. ............... 350/96.20 |
| 4,708,425 | 11/1987 | Gouali et al. ............... 350/96.16 |
| 4,725,128 | 2/1988 | Bornzin et al. ............... 350/96.20 |
| 4,732,451 | 3/1988 | Furuta et al. ............... 350/96.20 |

FOREIGN PATENT DOCUMENTS 56-102807 8/1981 Japan ............... 350/96.15

Primary Examiner—William L. Sikes
Assistant Examiner—Brian M. Healy
Attorney, Agent, or Firm—Joseph E. Szabo; Anthony W. Karambelas

[57] ABSTRACT

An apparatus for launching separate mode groups comprising an LED (13) and a collimator (C₁) for providing a first beam (19) of collimated light and an LED (15) and a collimator (C₂) for providing a second beam (23) of collimated light. The beams (19) and (23) intersect and form an acute angle A. A light guide (R₁) has a receiving face (27) at the intersection of the beams (19) and (23) so that the beams are launched into the light guide as first and second mode groups, respectively.

14 Claims, 2 Drawing Sheets

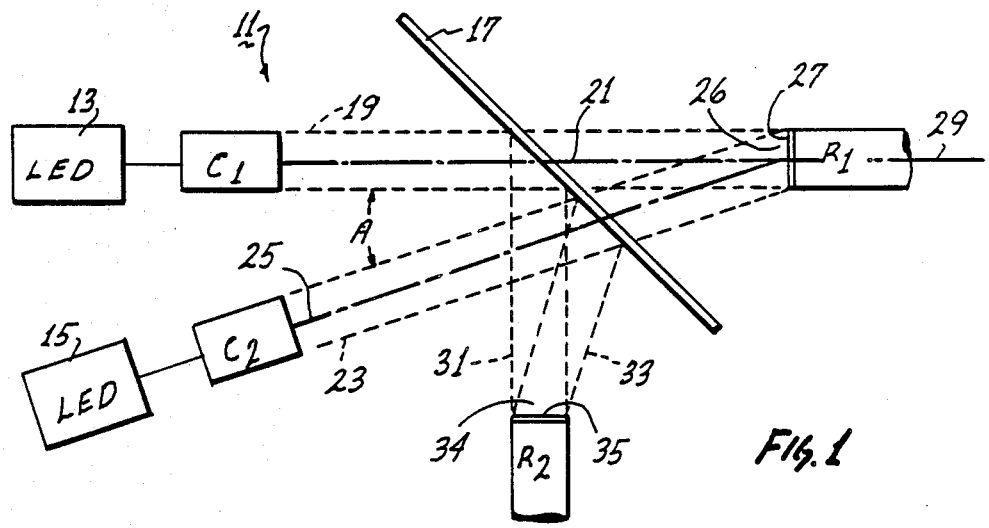
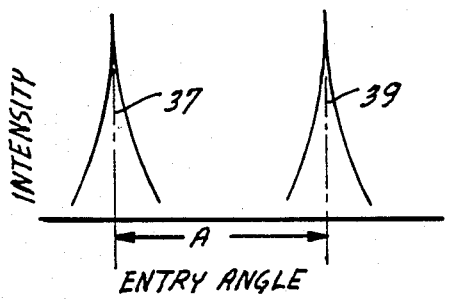
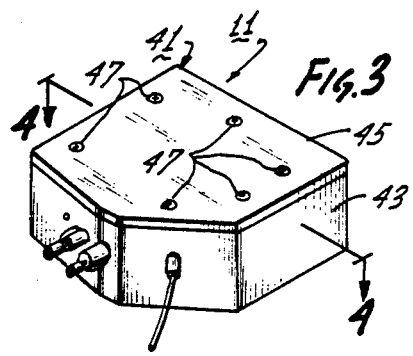

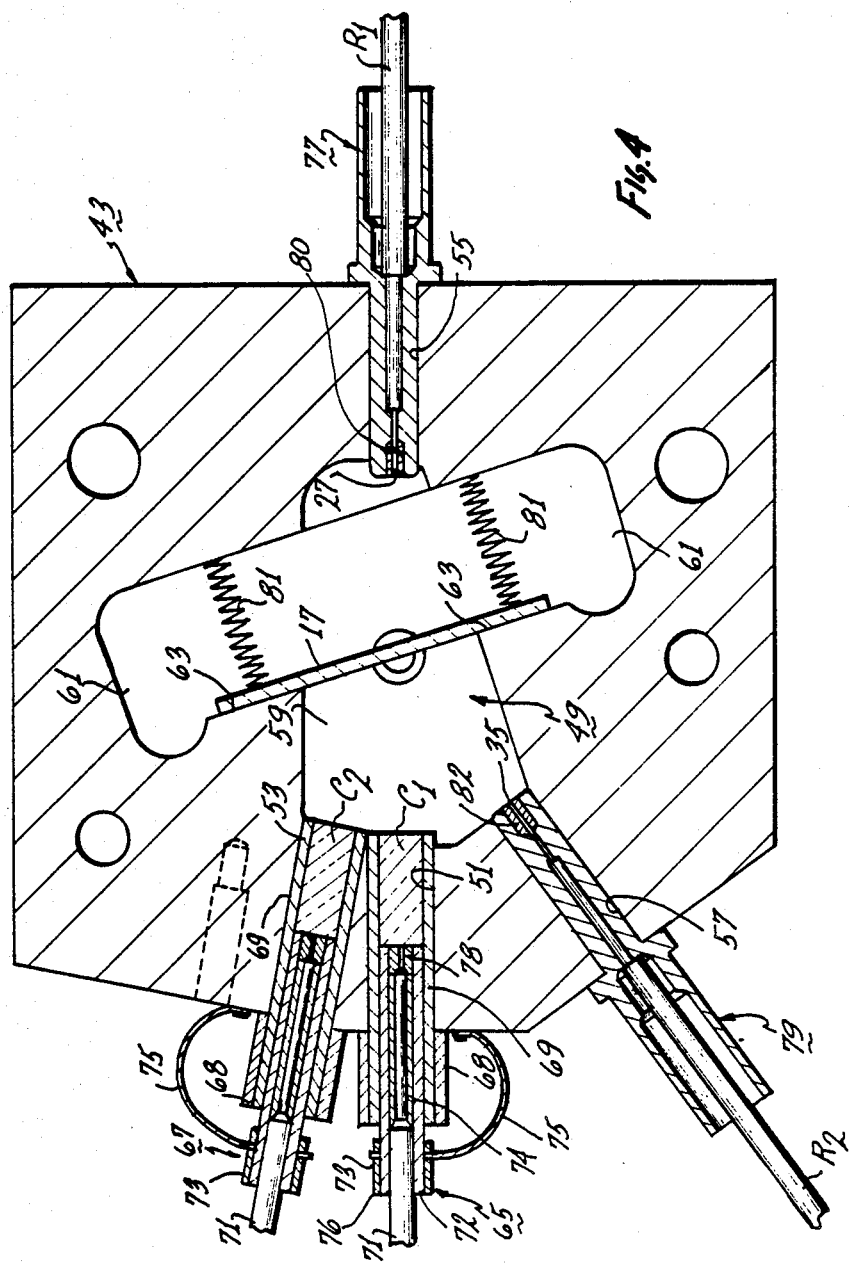

APPARATUS TO LAUNCH SEPARATED MODE GROUPS INTO OPTICAL FIBERS

BACKGROUND OF THE INVENTION

1. Field of the Invention

This invention relates to an apparatus for launching angularly separated mode groups in a light guide, such as an optical fiber.

2. Description of Related Art

Light guides, such as optical fibers and gradient index rods, can transmit angularly separated mode groups of optical energy. Angular separation of the mode groups may be achieved by introducing the optical energy to a receiving fiber from separate light sources at different entry angles, i.e., at different angles with respect to the longitudinal axis of the receiving fiber. The angularly separated mode groups can be simultaneously transmitted through an optical fiber.

This modal or angle multiplexing may be used, for example, to transmit information or in an intrusion detection system. Intrusion detection information can be obtained by appropriately comparing the modes transmitted by the optical fiber.

To select and launch these mode groups into a receiving fiber in a controlled manner is very difficult. One reason for this is that the receiving fiber typically has a very small diameter as compared to the relevant dimensions of the light source that must be used. Consequently, there may be a substantial power loss in launching of the optical energy into the fiber. In addition, a typical light source, such as a light emitting diode (LED) often emits light over a very broad range of angles. This broad range of angles reduces the modal purity, and the resulting combinations of power and modal purity that can be achieved are reduced. Modal purity is measured by the extent to which mode groups mix together and interfere with each other with a higher modal purity being obtained when such mixing and interfering are reduced.

In an attempt to address these problems, efforts have been made to very precisely control the alignment and tolerance accumulations inherent in manufacture and assembly. Unfortunately, this approach is costly, makes manufacture difficult and is sensitive to environmental conditions.

SUMMARY OF THE INVENTION

This invention provides an apparatus for launching angularly separated mode groups into a light guide which overcomes the problems noted above. Specifically, the mode groups are launched into the light guide with good power and modal purity while eliminating the need for high precision in the location and alignment of the components. The apparatus of this invention can be manufactured with relative ease, and the cost of the apparatus is reduced.

With this invention, collimated light is directed toward a receiving light guide. The collimated beams provide good modal purity and optimize the power-modal purity trade off. The collimated beams are preferably of greater cross-sectional area than the cross-sectional area of the receiving face of the light guide. This enables assembly of the components with relatively loose tolerances.

These desirable results are achieved by an apparatus which includes first means for providing a first beam of collimated light along a first axis and second means for providing a second beam of collimated light along a second axis, with the beams intersecting at a zone of intersection. The apparatus also includes a light guide having a receiving face at the zone of intersection of the beams so that the beams are launched into the light guide as first and second mode groups, respectively.

Each of the first and second means includes a light source, a collimator and light-transmitting means, such as an optical fiber for transmitting light to the collimator. The light source may be any conventional light source, such as an LED or a laser diode (LD) with or without light-transmitting optics. Collimation of the light beams can be achieved in any conventional way, such as by a collimating lens or a graded index rod. At the receiving end, the light guide may be any elongated member capable of transmitting angularly separated mode groups and, as such, may include, for example, a step index optical fiber and/or a graded index rod of appropriate pitch, such as ½ pitch.

If desired, a beam splitter may be utilized for reflecting portions of the collimated beams. The reflected portions of the collimated beams intersect at a zone of intersection, and a second light guide having a receiving face is at such zone of intersection. This launches angularly spaced mode groups into the second light guide. The reflected angularly separated mode groups can be used, for example, in a feedback circuit to stabilize the absolute power levels of the light sources. Although the use of reflected mode groups is desirable, it is not essential.

In a preferred construction, the apparatus includes a housing having a chamber therein, first and second ports and a receiving port, with each of the ports providing communication between the chamber and the exterior of the housing. First and second collimating means or collimators and first and second light-transmitting means are received in the first and second ports, respectively, and the light guide is received in the receiving port. The first and second ports face the receiving port so that the collimated light is directed toward the light guide. To facilitate manufacture, preferably the longitudinal axes of the first port and the receiving port are coaxial.

With this construction, a single housing provides three-dimensional alignment for all of the collimating optics and the receiving light guide. The required alignment can be achieved by, for example, controlling the fabrication of the relevant portions of the housing, such as the ports. To reduce the effects of temperature variations, one or more of the light-transmitting means is slidably received in the associated port, and resilient means resiliently urges the light-transmitting means toward and against the associated collimator.

If a beam splitter is to be provided, it is located in the cavity of the housing so it can direct the reflected portions of the collimated beams toward a second light guide received in a second receiving port of the housing. In a preferred construction, there is a shoulder in the chamber, and resilient means resiliently urges the beam splitter against the shoulder. The resilient means is preferable to an adhesive which might swell to displace the beam splitter and introduce significant error into the feedback circuit.

The invention, together with additional features and advantages thereof, may best be understood by reference to the following description taken in connection with the accompanying illustrative drawings.

BRIEF DESCRIPTION OF THE DRAWINGS

In the accompanying drawings:

FIG. 1 is a schematic view of one form of apparatus constructed in accordance with the teachings of this invention.

FIG. 2 is a plot of intensity versus entry angle which illustrates two angularly spaced mode groups of optical energy.

FIG. 3 is a perspective view illustrating one form of apparatus constructed in accordance with the teachings of this invention.

FIG. 4 is a sectional view taken generally along line 4—4 of FIG. 3.

DESCRIPTION OF THE PREFERRED EMBODIMENT

FIG. 1 shows an apparatus 11 which comprises light sources in the form of LED's 13 and 15, collimators $C_1$ and $C_2$, receiving light guides $R_1$ and $R_2$ and a beam splitter 17. In the embodiment illustrated, the LED's 13 and 15 are identical. The collimators $C_1$ and $C_2$ may be identical, and each of them may comprise, for example, a suitable collimating lens or a graded index rod.

In the apparatus 11, the LED 15 and the collimator $C_1$ cooperate to provide a first beam 19 of collimated light along a first axis 21, and the LED 15 and the collimator $C_2$ provide a second beam 23 of collimated light along a second axis 25. The beams 19 and 23 intersect at a zone of intersection 26 and form an acute angle A. The axes 21 and 25 also intersect at the same angle A.

The light guide $R_1$ must be of the type which is capable of transmitting angularly separated mode groups. Thus, the light guide $R_1$ must be capable of receiving collimated light at an entry angle and providing the collimated light at an exit angle which is equal to the entry angle. In other words, the light guide $R_1$ must be able to transmit angularly separated mode groups with a minimum of disturbance. Although a graded index rod of $\frac{1}{2}$ pitch length can be employed for the light guide $R_1$, in this embodiment the light guide $R_1$ is in the form of a step index optical fiber.

The light guide $R_1$ has a receiving face 27 at the zone of intersection 26 of the beams 19 and 23, and preferably, the receiving face is at the intersection of the axes 21 and 25. The light guide $R_1$ has a longitudinal or optical axis 29 which is coaxial with the axis 21, and although other orientations can be employed, the receiving face 27, in this embodiment, is perpendicular to the axes 21 and 29.

The beam splitter 17 extends across the collimated beams 19 and 23 and reflects portions of these beams to thereby form reflected beams 31 and 33, respectively. The reflected beams 31 and 33 intersect at a zone of intersection 34 and form an acute angle. The light guide $R_2$, which may be identical to the light guide $R_1$, has a receiving face 35 at the zone of intersection 34 of the reflected beams 31 and 33, and more particularly, at the intersection of the longitudinal axes of these beams.

Although various arrangements are possible, the reflected beam 31 and the longitudinal axis of the light guide $R_2$ are coaxial. Although the beam splitter 17 may be of different constructions, in the illustrated embodiment it is a plate of glass that will reflect a low percent, e.g. 8 percent, of the beams 19 and 23.

The entry angle of the beam 19 is the angle between the axis 21 of the beam 19 and the axis 29 of the light guide $R_1$. Because the axes 21 and 29 are coaxial, the entry angle of the beam 19 is zero. Similarly, the entry angle of beam 23 is the angle formed by the axes 25 and 29 which, in this embodiment, is equal to the angle A. In FIG. 1, the axes 21, 25 and 29 are co-planar; however, these axes may be in multiple planes, if desired.

The arrangement shown in FIG. 1 launches the beams 19 and 23 into the light guide $R_1$ as angularly separated mode groups 37 and 39, respectively (FIG. 2). As shown in FIG. 2, each of the mode groups 37 and 39 includes a plurality of separate modes and extends over a relatively narrow range of entry angles. Each of the mode groups 37 and 39 rises to a peak at a particular entry angle or small range of entry angles. The peaks are separated angularly by the angle A. Ideally, each of the mode groups 37 and 39 would comprise only a single mode which would extend through the peak of the associated mode group. However, because collimation of the light is not perfect, the collimated beams 19 and 23 each contain light having more than one entry angle. In addition, the diameter of the light guide $R_1$ is so small that it acts as a diffracting aperture. As a consequence, each of the mode groups 37 and 39 comprises multiple modes, with the intensity of the modes generally decreasing as their distance from the peak increases.

If the receiving face 27 is not perpendicular to the axis 29, this creates an offset angle which must be summed with the entry angle to obtain the effective entry angle. The effect of the offset angle is to move both of the mode groups 37 and 39 along the abscissa without changing the spacing between the peaks of the mode groups. The light guide $R_1$ transmits the mode groups 37 and 39 longitudinally within the light guide to other optical equipment (not shown) which may monitor or compare the mode groups for various purposes, such as information transfer or intrusion detection. Similar mode groups of lower intensity are launched into the light guide $R_2$ in the same manner as described above for the light guide $R_1$, and the reflected mode groups may be used, for example, to stabilize the absolute power levels of the sources 13 and 15.

FIGS. 3 and 4 show by way of example a physical embodiment of the apparatus 11. With reference to FIGS. 3 and 4, the apparatus 11 includes a housing 41 comprising a body 43 and a removable cover 45 attached to the body 43 in any suitable manner, such as by screws 47. The housing 41 is preferably constructed of a suitable metal.

As best shown in FIG. 4, the body 43 has a chamber 49 therein, first and second ports 51 and 53 and first and second receiving ports 55 and 57. The ports 51 and 53 face the receiving port 55, and each of the ports provides communication between the chamber 49 and the exterior of the housing 41. To facilitate manufacture, the ports 51 and 55 are preferably coaxial, and the orientation of all of the ports is controlled Although the chamber 49 may be of different constructions, in this embodiment, it comprises a main section 59 into which all of the ports 51, 53, 55 and 57 extend, and lateral sections 61 extending generally laterally from the main section 59 and providing shoulders 63. Preferably, all of the surfaces defining the chamber 49 are black to minimize light scattering. The chamber 49 is closed by the cover 45.

Identical modules 65 and 67 are received in ports 51 and 53, respectively. Only the module 65 is described in some detail, and corresponding reference numerals are used to designate corresponding parts of the module 67.

The module 65 is a commercially available optical component from Nippon Sheet Glass Co. Ltd. and comprises a collar 68 and a sleeve 69 fixed to the collar and suitably retained as by a set screw (not shown) in the port 51. The module 65 includes the collimator $C_1$ in the form of a graded index rod fixedly mounted in the sleeve. An optical fiber 71 is carried by a fitting 73, which also forms a portion of the module 65 and which is slidably received within the sleeve 69 so that the distal end of the optical fiber can be urged into contact with the collimator $C_1$. The optical fiber 71 transmits light from a source (not shown in FIGS. 3 and 4) to the collimator $C_1$. A suitable spring clip 75 is attached at its opposite ends to the body 43 and the fitting 73 to resiliently urge the fitting 73 into the sleeve 69 so as to maintain the optical fiber in contact with the collimator $C_1$ as temperature varies. The fitting 73 includes sleeves 72 and 74, a collar 76 and a jewel 78 in which the distal end of the core of the fiber 71 is suitably retained as by an epoxy.

Although various constructions are possible, in this embodiment, identical commercially available fittings 77 and 79 are received and retained within the receiving ports 55 and 57, respectively. Thus, as shown in FIG. 4, the light guide $R_1$ is in the form of a step index optical fiber suitably retained within the fitting 77 in a known manner as by a suitable epoxy. A distal portion of the core of the optical fiber forming the light guide $R_1$ is received and retained within a jewel 80 and terminates in the receiving face 27 which is polished and flush with the inner end of the fitting 77 and which lies just inside the chamber 49. Similarly, the light guide $R_2$ in this embodiment is also in the form of a step index optical fiber, and a distal portion of the core of the optical fiber is received and retained within a jewel 82 and terminates in the receiving face 35. The receiving face 35 is polished and flush with the inner end of the fitting 79 and lies just within the chamber 49.

The collimators $C_1$ and $C_2$ expand the beams from the associated optical fibers 71 from the relatively small diameter of the fiber core to the larger diameter of the collimators. Although not apparent from the schematic of FIG. 1, FIG. 3 illustrates that the collimated beam from the relatively large cross-sectional area collimators $C_1$ and $C_2$ would be much larger than the cross-sectional areas of the receiving faces 27 and 35. By way of example, each of the collimated beams may have a diameter of 0.040 inch, and each of the receiving faces 27 and 35 of the optical fibers may have a diameter of 0.002 inch.

In the form shown in FIG. 4, the beam splitter 17 rests on the floor of the chamber 49 and is retained against the shoulders 63 by resilient means in the form of springs 81 in the lateral sections 61 of the chamber 49. The ends of the springs 81 remote from the beam splitter 17 may be suitably held against the chamber wall by an appropriate adhesive composition.

The apparatus illustrated in FIG. 4 functions optically in the same manner as described above with reference to FIG. 1. The angular orientation of the optical components can vary, and this is illustrated in that the angles shown in FIG. 4 are not the same as the angles shown in FIG. 1. Similarly, the relative position of the components can be altered, and this can also be seen by comparing FIG. 1 with FIG. 4 which shows by way of example the collimator $C_1$ between the collimator $C_2$ and the light guide $R_2$. Of course, the apparatus 11 may have more than two angularly separated mode groups by providing additional appropriate optical inputs to the receiving light guide.

Although exemplary embodiments of the invention have been shown and described, many changes, modifications and substitutions may be made by one having ordinary skill in the art without necessarily departing from the spirit and scope of this invention.

What is claimed is:

1. An apparatus for launching separated mode groups comprising:
   first means for providing a first beam of collimated light along a first axis;
   second means for providing a second beam of collimated light along a second axis;
   said first and second beams intersecting at a zone of intersection;
   a light guide having a receiving face at the zone of intersection of the first and second beams whereby the first and second beams are launched into the light guide as first and second mode groups, respectively; and
   said light guide including means for transmitting the first and second mode groups longitudinally of the light guide.

2. An apparatus as defined in claim 1 wherein said first and second axes intersect and the receiving face of the light guide is substantially at the intersection of the first and second axes.

3. An apparatus as defined in claim 1 wherein the light guide has a longitudinal axis and said longitudinal axis and said first axis are substantially coaxial.

4. An apparatus as defined in claim 1 wherein the cross-sectional area of said first beam is greater than the cross-sectional area of the receiving face of the light guide.

5. An apparatus as defined in claim 1 wherein the light guide includes an optical fiber.

6. An apparatus as defined in claim 5 wherein said receiving face is a face of the optical fiber.

7. An apparatus as defined in claim 1 wherein said first means includes a light source and a graded index rod for collimating light from the source to provide said first beam of collimated light.

8. An apparatus as defined in claim 1 including a beam splitter for reflecting portions of the first and second beams, said portions of the first and second beams intersecting at a zone of intersection, and a second light guide having a receiving face at the zone of intersection of said portions of the first and second beams.

9. An apparatus as defined in claim 1 wherein the light guide includes a step index optical fiber.

10. An apparatus for launching separated mode groups comprising:
    a housing having a chamber therein, first and second ports and a receiving port, each of said first, second and receiving port providing communication between the chamber and the exterior of the housing, and said first and second ports facing said receiving port;
    first means received in said first port for collimating light to provide a first beam of collimated light;
    second means received in said second port for collimating light to provide a second beam of collimated light, said first and second beams being directed toward the receiving port and intersecting; and a light guide received in the receiving port and having a receiving face at the intersection of the first and second beams whereby the first and second beams are launched into the light guide as first and second mode groups, respectively.

11. An apparatus as defined in claim 10 wherein the first means includes a collimator and light transmitting means slidably received in the first port for transmitting light and the apparatus includes resilient means for resiliently urging the light transmitting means toward the collimator.

12. An apparatus as defined in claim 10 including a second receiving port providing communication between the chamber and the exterior of the housing, a beam splitter in the cavity for reflecting portions of the first and second beams toward the second receiving port, said portions of the first and second beams intersecting, and a second light guide received in the second receiving port and having a receiving face at the intersection of said portions of the first and second beams.

13. An apparatus as defined in claim 12 including a shoulder in the chamber and including resilient means for resiliently urging the beam splitter against the shoulder.

14. An apparatus as defined in claim 10 wherein the light guide includes a step index optical fiber received in said receiving port.

* * * * *